United States Patent [19]

Gousset

[11] Patent Number: 4,823,065
[45] Date of Patent: Apr. 18, 1989

[54] FREQUENCY CONVERTER FOR THE STABILIZED POWER SUPPLY OF ASYNCHRONOUS MOTORS

[75] Inventor: Alain Gousset, Rueil Malmaison, France

[73] Assignee: La Telemecanique Electrique, France

[21] Appl. No.: 161,079

[22] PCT Filed: May 20, 1987

[86] PCT No.: PCT/FR87/00166
§ 371 Date: Jan. 19, 1988
§ 102(e) Date: Jan. 19, 1988

[87] PCT Pub. No.: WO87/07455
PCT Pub. Date: Dec. 3, 1987

[30] Foreign Application Priority Data

May 21, 1986 [FR] France ................... 8607192

[51] Int. Cl.$^4$ .............................. H02P 5/40
[52] U.S. Cl. ..................... 318/798; 318/806; 363/58
[58] Field of Search ............... 318/798, 805, 806, 812; 363/57, 58

[56] References Cited

U.S. PATENT DOCUMENTS

| | | | |
|---|---|---|---|
| 3,753,063 | 8/1973 | Graf | 318/806 |
| 4,139,885 | 2/1979 | Overzet et al. | 363/58 |
| 4,186,334 | 1/1980 | Hirata | 318/805 |
| 4,238,821 | 12/1980 | Walker | 363/58 |

Primary Examiner—David Smith, Jr.
Attorney, Agent, or Firm—William A. Drucker

[57] ABSTRACT

A frequency converter is provided for the power supply of an asynchronous motor, comprising:
 a rectifier bridge (11) connected to a multiphase network and to an intermediate DC circuit (12);
 an inverter (13) comprising three pairs of static switches (T1-T6) connected in a Graetz bridge; characterized by;
 a means (21) for reading the current associated with the intermediate circuit (12) and elaborating an image signal of the reverse circuit and delivering an image signal of the current in this circuit;
 a stabilization control circuit (22) connected to said means (21) and delivering a reverse current excess signal (ST) when the signal ($I_d$) exceeds an adjustable threshold; and
 a means (25) for reducing the output voltages of the inverter, and adapted for modifying the modulated pulses, this means being controlled by the output signal (ST) of the stabilization control circuit (22).

8 Claims, 3 Drawing Sheets

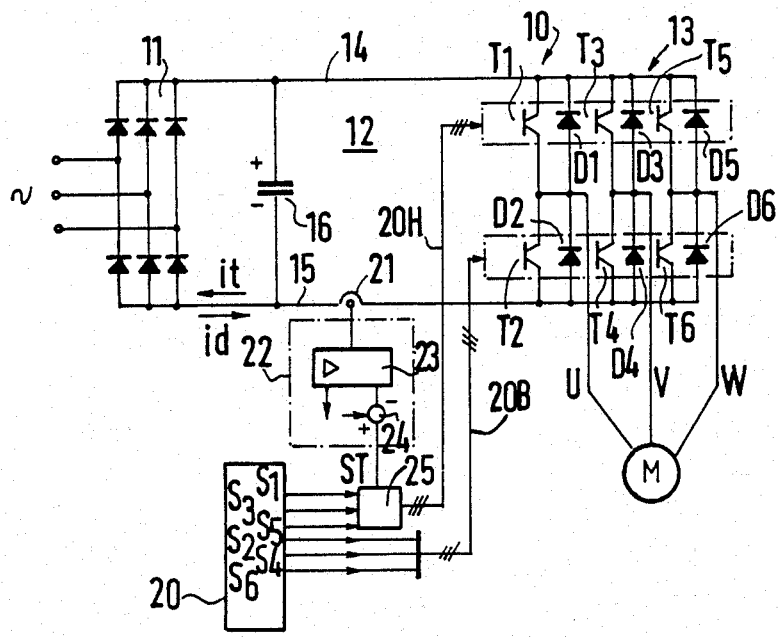
FIG.1
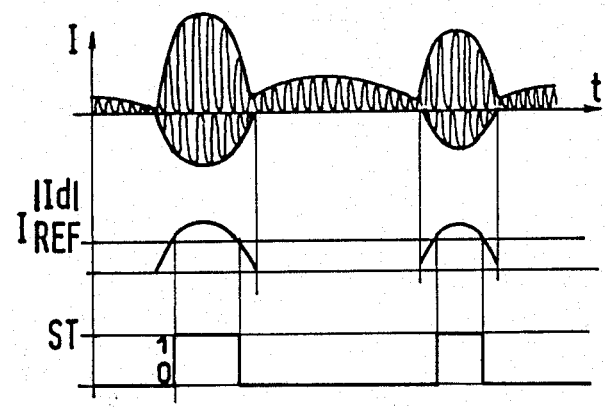
FIG.2A
FIG.2B
FIG.2C
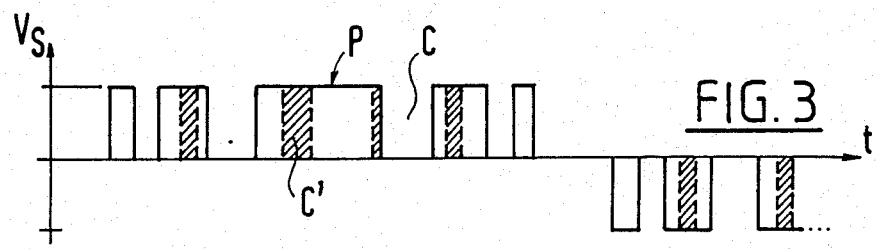
FIG.3

FREQUENCY CONVERTER FOR THE STABILIZED POWER SUPPLY OF ASYNCHRONOUS MOTORS

The invention relates to a static frequency converter for the power supply of an asynchronous type motor, including a rectifier bridge connectable to a multiphase network, an intermediate DC circuit and an inverter with six static switches connected in a Graetz bridge, controlled by a pulse modulation device and connectable to the phase impedances of the motor.

Asynchronous motors fed from three-phase networks through frequency converters generally suffer from operating instability when they are lightly loaded. The appearance of an oscillation of the rotor of the motor may in fact be observed due to an energy exchange between the motor and the intermediate DC circuit in a frequency range of about 20 to 100% of the nominal frequency.

For correcting such instability, it would be possible to use a speed servo-control using a speed sensor, or else current sensors in the phase conductors of the motor, but such solutions are expensive and necessarily associated with the motor.

As is known, the voltage U and the frequency F for the supply of an asynchronous motor through a frequency converter must remain normally related by a given law, for example with a constant U/F ratio.

The aim of the present invention is especially to overcome the low frequency oscillation of the rotor of a lightly loaded asynchronous motor by reducing the power supply voltage U of the motor when such an oscillation occurs so as to momentarily reduce the U/F ratio. It aims in addition at stabilizing the drive of the motor using a simple device, while providing a good compromise between the drive quality and the desired stability.

It has as object to combine the desired low load stabilization with a limitation of the currents of the motor at the time of sudden load variations.

In accordance with the invention, the frequency converter includes a means for reading the current associated with the intermediate DC circuit and delivering a signal which is the image of the current in the intermediate circuit, processing means connected to the reading means and adapted for detecting instability of the signal, and a means for reducing the output voltages of the inverter, this means being adapted for modifying the modulated pulses delivered by the control device and being controlled by the processing means.

The frequency deviation thus obtained reduces the U/F ratio and places operation outside the zone of instability.

The means for reducing the output voltages of the inverter may cooperate with the device controlling the static switches of the inverter for alternately disabling the high channel switches and the group of low channel switches synchronously with the modulation exerted on each group of switches. The result is a good symmetrization of the currents of the motor.

In a first embodiment, the processing means deliver a reverse current excess signal ST and include a processing circuit connected to the current reading means and elaborating a filtered peak signal $I_d$ representative of the peak value of the reverse current and a comparator comparing this signal with an adjustable reference value $I_{REF}$ for generating, when $I_d > I_{REF}$, the reverse current excess signal ST applicable to the output voltage reduction means.

The construction of the stabilization device is thus very simple. Furthermore, it facilitates the addition of simple means for inhibiting the signal ST when the motor operates as a generator and, when required, disabling of the high or low channel or alternately of the high channel and of the low channel switches when a high load surge is detected in the generator mode.

In a second embodiment, the processing means include a member establishing the mean value of the image signal of the current in the intermediate circuit, as well as an A-D converter receiving the mean value signal and delivering a digital signal; the voltage reduction means include a processor having means for sampling the digital signal and means for evaluating the amplitude and/or the oscillation frequency of the signal; the control device includes modulation control means for modulating the conduction of the switches, the oscillation evaluation means acting on the modulation control means for correcting said modulation as a function of the oscillation of the mean current in the intermediate circuit. The voltage reduction means and the control device may advantageously be implemented in a suitably programmed microprocessor.

The following description with reference to the drawings of a particular embodiment will clearly show the characteristics and advantages of the invention.

In the accompanying drawings:

FIG. 1 is the diagram of a static frequency converter in accordance with the invention;

FIGS. 2A, 2B, 2C are timing diagrams showing respectively the image signals of the current in the intermediate circuit, of its reverse current component and the stabilization control signal;

FIG. 3 shows a timing diagram of an output phase voltage of the inverter of the converter of FIG. 1;

Figure 4:
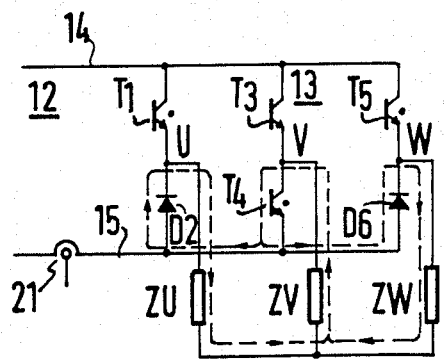
FIG. 4 shows one example of routing the current in the low channels of the inverter when the high channels thereof are disabled.

The static frequency converter 10 illustrated in FIG. 1 is connected to a three-phase or possibly single-phase AC voltage network. The converter is of the voltage wave type and includes a three-phase rectifier bridge 11, an intermediate DC circuit 12 and an inverter 13. The rectifier bridge 11 has six diodes connected to the phases of the network so as to output a DC voltage to the intermediate circuit 12. This latter includes two respective high channel and low channel conductors 14, 15 between which is disposed a filtering capacitor 16. The polarity at the terminals of capacitor 16 remains constant.

The inverter 13 is connected, on the input side, to conductors 14, 15 and, on the output side to the phase conductors U, V, W of an asynchronous motor M. The motor could also be a synchronized asynchronous motor.

The inverter includes six controlled static switches connected in a Graetz bridge and formed, in the present embodiment, by three pairs of bipolar transistors T1–T6 in parallel with which are disposed respective recovery diodes D1–D6. Each pair of transistors includes two cascaded transistors T1, T2; T3, T4; T5, T6 one of which T1, T3, T5 is said to be high channel and the other T2, T4, T6 low channel. The middle point of each pair is connected to a respective stator impedance ZU, ZV, ZW of the motor (see FIG. 4). The controlled switches of the inverter may be disablable (GTO) or non disablable (SCR) thyristors with assisted switching if required or else isolated grid transistors, or MOS bipolar components.

The bases of the high channel transistors T1, T3, T5 are controlled via respective conductors 20H by the outputs S1, S3, S5 of a control device 20. The bases of the low channel transistors T2, T4, T6 are controlled via conductors 20B by the outputs S2, S4, S6 of device 20. This device is, for example, a microprocessor adapted for generating at its outputs the modulated width pulses (PWM) required for driving the bases of the transistors as a function of the information delivered to the inputs of the microprocessor by regulation or control loops not shown.

Figure 2:
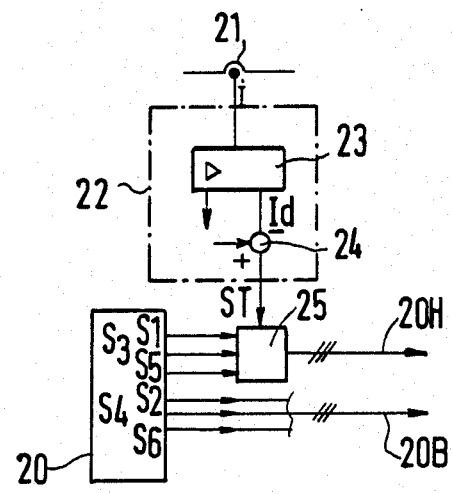
FIG. 2 shows a part of the diagram of FIG. 1 in a first embodiment.

In accordance with the invention, a means 21 is provided for reading the current in the intermediate circuit 12. This means delivers a signal I which is the image of the current and it is connected to a processing means 22 which, in the example of FIG. 2, elaborate a filtered peak signal $I_d$ which is the image of the reverse current and which generates a stabilization control signal ST representative of an excess reverse current. Means 21 sensors the current in conductor 15, but it could of course be associated with conductor 14. The current reading means 21, is here formed by a resistor, but may be any appropriate current sensor.

The processing means 22 are connected to a means 25 for reducing the output voltage of the inverter. In the example shown in FIG. 2, the processing means 22 include a processing circuit 23 which delivers the signal $I_d$ which is the image of the reverse current and a comparator 24. The processing circuit 23 extracts from the signal I delivered by means 21 the component $I_d$ representative of the reverse current $i_d$ generated by the inverter particularly during oscillations of the motor. This reverse current may also be called "diode" current since it passes through the recovery diodes of the inverter.

Comparator 24 compares the signal $I_d$, image of the reverse current, with a reference value $I_{REF}$ for producing the stabilization control signal ST when $I_d > I_{REF}$. The reference value $I_{REF}$ is preferably adjustable so more particularly as to allow the stabilization to be adapted to the motor fed by the frequency converter and/or to the driven load.

The stabilization control signal ST obtained at the output of comparator 24 is applied to the means 25 for reducing the output voltages of the inverter. This reduction means is here formed by a logic circuit or static switches blocking, during the change of state of the output ST of the comparator, the pulses normally delivered by the outputs S1, S3, S5 of the microprocessor associated with the high channels of the inverter. The logic circuit 25 could of course as a variant block the outputs S2, S4, S6 corresponding to the low channels of the inverter. When the static switches of the inverter are disablable thyristors (GTO), the logic circuit 25 may also control the forcing of turnoff conductors of the GTOs.

The signals I, $I_d$ and ST are illustrated in FIGS. 2A, 2B and 2C whereas the shape of the chopped voltage Vs appearing at the output of the inverter on one phase is shown in FIG. 3; the routing of the current flowing during blocking of the high channels is illustrated in FIG. 4.

The voltage Vs is formed of alternately positive and negative groups of pulses P of variable width (FIG. 3). Each pulse corresponds to the simultaneous enabled state, under the effect of the corresponding signals on conductors 20H, 20B of a high channel transistor and of a low channel transistor. These pulses P are separated by intervals C of variable width. When an operating instability occurs, for example because the asynchronous motor is lightly loaded, the current in the intermediate circuit assumes the trend shown in FIG. 2A. The positive part of the signal I is a signal which is the image of the motor current or of the current in the transistors, the negative part of the signal I being the image signal of the reverse current or "diode" current. The processing circuit 23 extracts from I the filtered peak signal $I_d$ which is compared with $I_{REF}$ (FIG. 2B) in the comparator 24, this latter delivering at its output the signal ST (FIG. 2C).

The means 25 which on the one hand receives the signal ST and on the other the signals S1, S3, S5 provides a succession of brief turn-offs of the whole of the high channel transistors of the inverter; the result is an additional chopping of the voltage Vs by intervals C' formed in the pulses P.

In FIGS. 4, it has been assumed that the high channel transistors T1, T3, T5 are disabled by appropriate signals on conductors 20H and the signals on conductors 20B have just controlled the closure of T4 and the disabling of T2 and T6. It can be seen that the current flows between transistor T4 and the antiparallel recovery diodes D2 and D6. The between phase voltage is zero. More generally, in the case of disabling of one of the groups of channels of the inverter, the path of the circulating current is looped to one of the transistors and to the recovery diodes associated with the other two transistors of the other group of channels.

Figure 5:
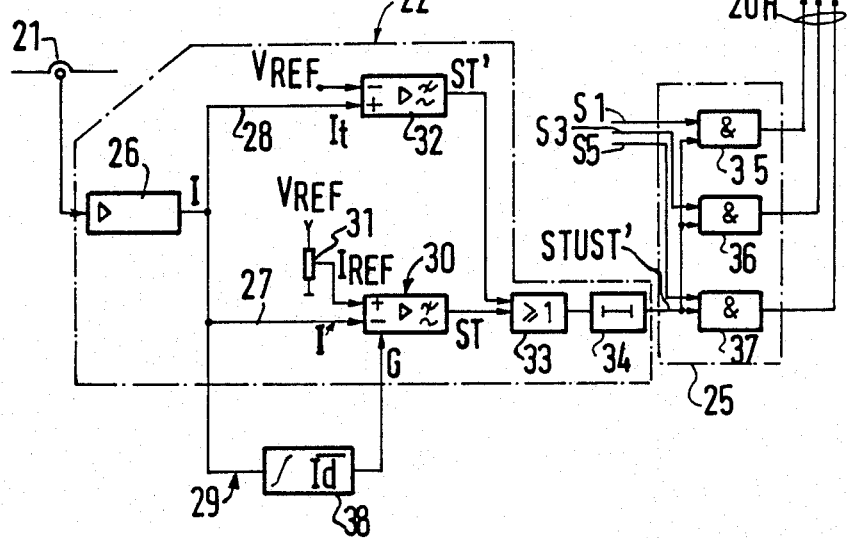
FIG. 5 shows schematically one embodiment of the stabilization circuit associated with the inverter.

In the embodiment shown in FIG. 5, the signal delivered by the current reading means 21 is amplified by an amplifier 26 then processed in three control channels 27, 28, 29.

The control channel 27 includes an amplifier-comparator 30 which receives the signal I at an inverter input, for revealing the negative component of signal I, as well as filtering and peak detection of this component so as to provide the signal $I_d$, the image of the envelope of the reverse current. Comparator 30 compares the signal $I_d$ with an adjustable reference signal $I_{REF}$, obtained from a fixed voltage $V_{REF}$ by means of an adjustment potentiometer 31 and it generates an output signal ST when $I_d > I_{REF}$.

The control channel 28 includes an amplifier-comparator 32 providing filtering and peak detection of the image signal of the transistor current $I_t$ and comparison thereof with a fixed threshold, as a function of a voltage $V_{REF}$. The signal ST' resulting from overshooting of the threshold by signal $I_t$ is applied to an input of an OR gate 33 whose other input receives the signal ST. The output signal of the OR gate 33 transits through a delay element 34 for application for a given time by this element to the first inputs of AND gates 35, 36, 37 forming the disabling means ensuring the desired voltage reduction. Second inputs of the AND gates 35, 36, 37 receive respectively the signals S1, S3, S5. The delay element is a rapid charge and slow discharge RC circuit but may also be formed by a monostable flip-flop; it avoids imposing too high a chopping frequency on the transistors.

The control channel 29 has a means 38, for example an integrator or similar means, providing the mean value $I_d$ of the image signal of the reverse current $I_d$ and emitting a signal G for inhibiting the signal ST when this mean value exceeds a given threshold. The signal G is for example fed to the amplifier-comparator 30. Thus, when the motor is operating as a generator, the signal G inhibits the appearance of signal ST and thus prevents disabling of the transistors T1, T3, T5 of the high channels. The comparators described may be threshold operators.

The frequency converter described operates in the following way: during normal operation of the motor, the current flows through line 15 of the intermediate circuit 12, as shown by arrow $i_t$ in FIG. 1. The control circuit remains inactive.

Should oscillation or instability occur due to a low load of the motor, a reverse component appears as is indicated by the arrow $i_d$ in FIG. 1. The processing circuit 23 develops then the signal $I_d$ and the comparator 24 - or the amplifier 30 which combines the functions of 23 and 24 - generates a succession of pulses forming the signal ST. These pulses disable the gates 35-37 and the result is additional chopping C' of the modulated width pulses P delivered by the control device 20 until the detected instability disappears.

When the motor is operating as a generator, the signal $I_d$ of the mean value of current $i_d$ reaches a sufficient value for the signal G' to change state and lock the comparator 30, so that the reverse current may flow normally to the three-phase network.

When a high load variation is detected by channel 28, the signal ST' changes state and the high channels of the inverter are disabled, as in the above mentioned case of too low a load.

As is known, in a frequency converter of the type described, the control device 20 produces an alternate modulation of the conduction of the switches of the first group T1, T3, T5, then of the second group T2, T4, T6, then again of the first group T1, T3, T5, etc. . . , the groups of conductors 20H, 20B being thus activated alternately.

Preferably, the output voltage reduction means 25 will deliver voltage reduction intervals C' also alternately to the groups of modulating switches, that is to say synchronously with the modulation provided by the groups of conductors 20H, then 20B, etc...Thus, the currents of the motor are symmetrized and the troublesome effects of parasite diode currents are reduced.

The output voltage reduction means 25 and possibly a part of the processing means 22 are implemented in the same control logic, for example in the same microprocessor.

Figure 6:
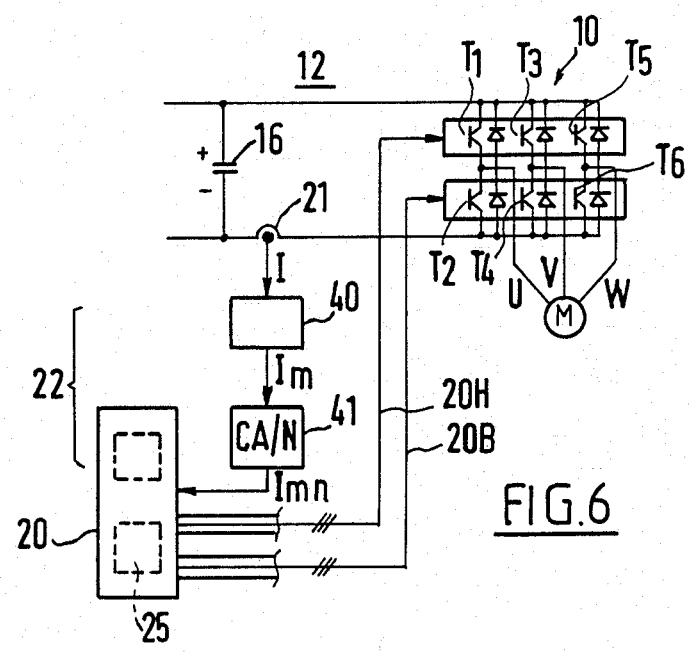
FIG. 6 shows schematically a second embodiment of the frequency converter of the invention.

In the embodiment shown in FIG. 6, the processing means 22 include a means 40 providing the means value $I_m$ of the image signal I of the current in the intermediate circuit, as well as an A-D converter 41 receiving the mean value signal $I_m$ and delivering a digital signal $I_{mn}$.

The voltage reduction means 25 include a processor having means for sampling the digital signal $I_{mn}$ and means for evaluating the amplitude and/or the frequency of oscillation of the signal $I_{mn}$.

The control device 20 is a microprocessor which includes the voltage reduction means 25. Microprocessor 20 has modulation control means for modulating the conduction of switches T1-T6; the oscillation evaluation means interact on the modulation control means for correcting the modulation as a function of the evaluated value of the oscillation of the mean current in the intermediate circuit. The means included in microprocessor 20 are in material and software form.

I claim:

1. A frequency converter for an AC power supply of an asynchronous type motor, comprising:
   i. a rectifier bridge having input AC terminals which can be connected to a multiphase network and two DC output terminals connected to two respective conductors of a DC intermediate circuit;
   ii. an inverter having two DC input terminals respectively connected to the said conductors so as to receive a DC current provided by the rectifier and flowing in the conductors, said inverter comprising three pairs of static switches, each pair being connected to the two DC input terminals and comprising two series connected switches, one of which is said to be a high channel switch, and the other, a low channel switch, and which are each provided with a recovery diode in parallel, each of said pairs having a middle point which constitutes an AC output terminal which can be connected to a phase impedance of the motor, the said inverter having output voltages between the output terminals;
   iii. a device for controlling the switches being connected thereto for applying thereto modulated pulses for ensuring closing and opening thereof according to a modulation;
   iv. a means for reading the DC current in one of the said conductors and for delivering an image signal of this DC current;
   v. a processing means connected to the reading means, said processing means comprising means for detecting an instability of the image signal and means for generating a stabilization control signal when the said instability is detected;
   vi. a means for reducing the output voltages of the inverter, said means being connected to the processing means so as to receive the stabilization control signal, and comprising means for modifying the modulated pulses delivered by the control device when the stabilization control signal is emitted, wherein the said conductors conduct a reverse current passing through the said recovery diodes and the processing means deliver a reverse current excess signal (ST) and include a processing circuit connected to the current reading means and providing a filtered peak signal representative of the peak value of the reverse current and a comparator comparing this signal ($I_d$) with an adjustable reference value ($I_{REF}$) for generating when $I_d > I_{REF}$, the reverse current excess signal (ST) applicable to the output voltage reduction means.

2. Frequency converter according to claim 1, wherein a delay element is provided for maintaining the reverse current excess signal (ST) for a given time.

3. Frequency converter according to claim 1, which comprises an integrating means for providing the mean value ($I_d$) of the reverse current and comparing this means value with a given threshold, one input of said integrating means being connected to the current reading means, whereas an output of said integrating means delivers a signal (G) inhibiting the reverse current excess signal (ST) when the motor operates as a generator.

4. Frequency converter according to claim 1, characterized by the fact that a comparator (32) is connected to the current reading means (21) and is adapted for comparing an image signal of the motor current ($I_t$) with a reference value so as to deliver a motor current excess signal (ST'), the reverse current excess (ST) and motor current excess (ST') signals being applied to the inputs of an OR gate (33) whose output is connected via a delay element (34) to the inverter.

5. A frequency converter for an AC power supply of an asynchronous type motor, comprising:
   i. a rectifier bridge having input AC terminals which can be connected to a multiphase network and two DC output terminals connected to two respective conductors of a DC intermediate circuit;
   ii. an inverter having two DC input terminals respectively connected to the said conductors so as to receive a DC current provided by the rectifier and flowing in the conductors, said inverter comprising three pairs of static switches; each pair being connected to the two DC input terminals and comprising two series connected switches, one of which is said to be a high channel switch, and the other, a low channel switch, and which are each provided with a recovery diode in parallel, each of said pairs having a middle point which constitutes an AC output terminal which can be connected to a phase impedance of the motor, the said inverter having output voltages between the output terminals;
   iii. a device for controlling the switches being connected thereto for applying thereto modulated pulses for ensuring closing and opening thereof according to a modulation;
   iv. a means for reading the DC current in one of the said conductors and for delivering an image signal of this DC current;
   v. a processing means connected to the reading means, said processing means comprising means for detecting an instability of the image signal and means for generating a stabilization control signal when the said instability is detected;
   vi. a means for reducing the output voltages of the inverter, said means being connected to the processing means so as to receive the stabilization control signal, and comprising means for modifying the modulated pulses delivered by the control device when the stabilization control signal is emitted, wherein:
   the processing means comprises a means establishing the means value ($I_m$) of the image signal (I) of the current in the intermediate circuit, as well as an A-D converter receiving a mean value signal ($I_m$) and delivering a digital signal ($I_{mn}$),
   the voltage reduction means include a processor having means for sampling the digital signal ($I_{mn}$) and means for evaluating the amplitude and/or the frequency of oscillation of the signal ($I_{mn}$),
   the control device comprises modulation control means for modulating the closing of the switches (T1-T6),
   the evaluation means acting on the modulation control means for correcting said modulation as a function of the oscillation of the mean current in the intermediate circuit.

6. Frequency converter according to claim 5, characterized by the fact that the voltage reduction means (25) and the control device (20) are implemented in a microprocessor.

7. A frequency converter for an AC power supply of an asynchronous type motor, comprising:
   i. a rectifier bridge having input AC terminals which can be connected to a multiphase network and two AC output terminals connected to two respective conductors of a DC intermediate circuit;
   ii. an inverter having two DC input terminals respectively connected to the said conductors so as to receive a DC current provided by the rectifier and flowing in the conductors, said inverter comprising three pairs of static switches, each pair being connected to the two DC input terminals and comprising two series connected switches, one of which is said to be a high channel switch, and the other, a low channel switch, and which are each provided with a recovery diode in parallel, each of said pair shaving a middle point which constitutes an AC output terminal which can be connected to a phase impedance of the motor, the said inverter having output voltages between the output terminals;
   iii. a device for controlling the switches being connected thereto for applying thereto modulated pulses for ensuring closing and opening thereof according to a modulation;
   iv. a means for reading the DC current in one of the said conductors and for delivering an image signal of this DC current;
   v. a processing means connected to the reading means, said processing means comprising means for detecting an instability of the image signal and means for generating a stabilization control signal when the instability is detected;
   vi. a means for reducing the output voltages of the inverter, said means being connected to the processing means so as to receive the stabilization control signal, and comprising means for alternative disabling the high channel switches and the low channel switches synchronously with the said modulation when the stabilization control signal is emitted.

8. A frequency converter for an AC power supply of an asynchronous type motor, comprising:
   i. a rectifier bridge having input AC terminals which can be connected to a multiphase network and two DC output terminals connected to two respective conductors of a DC intermediate circuit;
   ii. an inverter having two DC input terminals respectively connected to the said conductors so as to receive a DC current provided by the rectifier and flowing in the conductors, said inverter comprising three pairs of static switches, each pair being connected to the two DC input terminals and comprising two series connected switches, one of which is said to be a high channel switch, and the other, a low channel switch, and which are each provided with a recovery diode in parallel, each of said pairs having a middle point which constitutes an AC output terminal which can be connected to a phase impedance of the motor, the said inverter having output voltages between the output terminals;
   iii. a device for controlling the switches being connected thereto for applying thereto modulated pulses for ensuring closing and opening thereof according to a modulation;
   iv. a means for reading the DC current in one of the said conductors and for delivering an image signal of this DC current;
   v. a processing means connected to the reading means, said processing means comprising means for detecting an instability of the image signal and means for generating a stabilization control signal when the said instability is detected;

vi. a means for reducing the output voltages of the inverter, said means being connected to the processing means so as to receive the stabilization control signal, and comprising means for only disabling the high channel switches or the low channel switches when the stabilization control signal is emitted.

* * * * *